United States Patent
Lumbatis et al.

(10) Patent No.: US 9,848,319 B2
(45) Date of Patent: Dec. 19, 2017

(54) SERVICE SET DETERMINATION BASED UPON DEVICE TYPE IDENTIFIER

(71) Applicant: ARRIS Enterprises LLC, Suwanee, GA (US)

(72) Inventors: Kurt Alan Lumbatis, Dacula, GA (US); Loc Quang Le, Lawrenceville, GA (US); Charles Hardt, Lawrenceville, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/141,161

(22) Filed: Apr. 28, 2016

(65) Prior Publication Data
US 2016/0323735 A1 Nov. 3, 2016

Related U.S. Application Data

(60) Provisional application No. 62/153,759, filed on Apr. 28, 2015, provisional application No. 62/158,099, filed on May 7, 2015.

(51) Int. Cl.
*H04M 3/00* (2006.01)
*H04W 8/24* (2009.01)
(Continued)

(52) U.S. Cl.
CPC ............ *H04W 8/24* (2013.01); *H04L 41/0806* (2013.01); *H04W 48/16* (2013.01); *H04W 84/12* (2013.01)

(58) Field of Classification Search
CPC ....... H04W 8/24; H04W 84/12; H04W 48/16; H04L 41/0806
(Continued)

(56) References Cited

U.S. PATENT DOCUMENTS 7,302,255 B1 * 11/2007 Lundy ............... H04L 29/06027
370/338
7,561,898 B2 * 7/2009 Seo ........................ H04W 48/16
370/254
(Continued)

FOREIGN PATENT DOCUMENTS

WO 2004/013986 A1 2/2004

OTHER PUBLICATIONS

PCT Search Report & Written Opinion, Re: Application No. PCT/US2016/029786, dated Jul. 4, 2016.

*Primary Examiner* — Babar Sarwar
(74) *Attorney, Agent, or Firm* — Bart A. Perkins

(57) ABSTRACT

Methods, systems, and computer readable media can be operable to facilitate the configuration of a device with service set information based upon an identification of a device-type associated with the device. A device-type identifier may be retrieved from a communication that is received from a device requesting a service from an access point. The device-type identifier may be compared to one or more correlations between device-types and service sets that are maintained within a database, and the device may be configured with information for a service set that is correlated with the retrieved device-type identifier, or the device may be configured with information for a default service set. Certain service sets offered by an access point may remain inactive when not in use, and if a device is configured with information for an inactive service set, the access point may automatically enable the service set.

17 Claims, 7 Drawing Sheets

(51) Int. Cl.
*H04W 48/16* (2009.01)
*H04L 12/24* (2006.01)
*H04W 84/12* (2009.01)

(58) Field of Classification Search
USPC ............ 455/404.2, 412.1–414.2, 418–422.1,
455/435.2–435.3, 436, 444, 41.1–41.2,
455/434, 456, 550.1, 561; 370/328–332,
370/338
See application file for complete search history.

(56) References Cited

U.S. PATENT DOCUMENTS

| | | | | |
|---|---|---|---|---|
| 7,664,527 | B2* | 2/2010 | Bari .................. | H04W 12/06 455/550.1 |
| 8,804,964 | B2* | 8/2014 | Jan ................... | H04L 9/083 370/310 |
| 8,880,047 | B2* | 11/2014 | Konicek ........... | H04M 1/72513 455/414.1 |
| 2006/0153122 | A1 | 7/2006 | Hinman et al. | |
| 2008/0072047 | A1* | 3/2008 | Sarikaya .......... | H04L 9/32 713/171 |
| 2010/0182959 | A1* | 7/2010 | Cook ................ | H04M 11/062 370/329 |
| 2012/0010923 | A1* | 1/2012 | Yarmolich ........ | G06Q 20/10 705/7.32 |
| 2013/0023262 | A1* | 1/2013 | Zhang .............. | H04W 48/18 455/418 |
| 2013/0137450 | A1* | 5/2013 | Dai .................. | H04W 4/043 455/456.1 |
| 2013/0279489 | A1 | 10/2013 | Calcev et al. | |
| 2015/0237543 | A1* | 8/2015 | Montemurro ..... | H04W 36/0061 455/436 |
| 2015/0373769 | A1* | 12/2015 | Wang ............... | H04W 4/008 455/419 |
| 2016/0142884 | A1* | 5/2016 | Sears ............... | H04W 4/028 455/404.2 |

* cited by examiner

SERVICE SET DETERMINATION BASED UPON DEVICE TYPE IDENTIFIER

CROSS REFERENCE TO RELATED APPLICATION

This application is a non-provisional application claiming the benefit of U.S. Provisional Application Ser. No. 62/153,759, entitled "Multiple Service Support for Wireless Provisioning Services," which was filed on Apr. 28, 2015, and further claiming the benefit of U.S. Provisional Application Ser. No. 62/158,099, entitled "Multi BSS WPS Activation of BSS Activity," which was filed on May 7, 2015. Both the U.S. Provisional Application Ser. No. 62/153,759 and the U.S. Provisional Application Ser. No. 62/158,099 are incorporated herein by reference in their entirety.

TECHNICAL FIELD

This disclosure relates to configuring a device with service set information based on an identification of a device-type associated with the device.

BACKGROUND

One or more access points may be installed at a subscriber premise to provide a subscriber with a local network such as a wireless local area network (WLAN) for accessing multiple services that are delivered to the subscriber premise. An access point may provide a plurality of service sets wherein each service set is designated for use to provide certain services. For example, service sets may be designated for delivery of encrypted communications over a password-protected, private network, communications associated with a specific service (e.g., video, data, voice, security, etc.), or communications associated with a public network (e.g., unencrypted or encrypted hotspot network).

Currently, wireless provisioning services (WPS) may only be enabled by an access point over a single service set, thus a client device attempting to associate with the access point via WPS may not receive configuration information for an optimal service set (e.g., a service set designated for providing a service that is to be requested by the client device). Current access points utilizing WPS are only able to support a single service configuration. Therefore, it is desirable to improve upon methods and systems for pushing configuration information for a specific service set from an access point utilizing WPS to a client device.

Moreover, in a wireless deployment where multiple services are being offered via separate service sets (e.g., basic service sets (BSS) as defined in the IEEE 802.11 standard), and where no devices have joined one or more service sets related to a particular service (e.g., home security, video services, data services, etc.), airtime bandwidth may be wasted by supporting the one or more unused service sets. Therefore, it is desirable to improve upon methods and systems for automatically enabling and/or disabling service sets based upon a demand for the service sets.

BRIEF DESCRIPTION OF THE DRAWINGS

Like reference numbers and designations in the various drawings indicate like elements.

DETAILED DESCRIPTION

Figure 1:
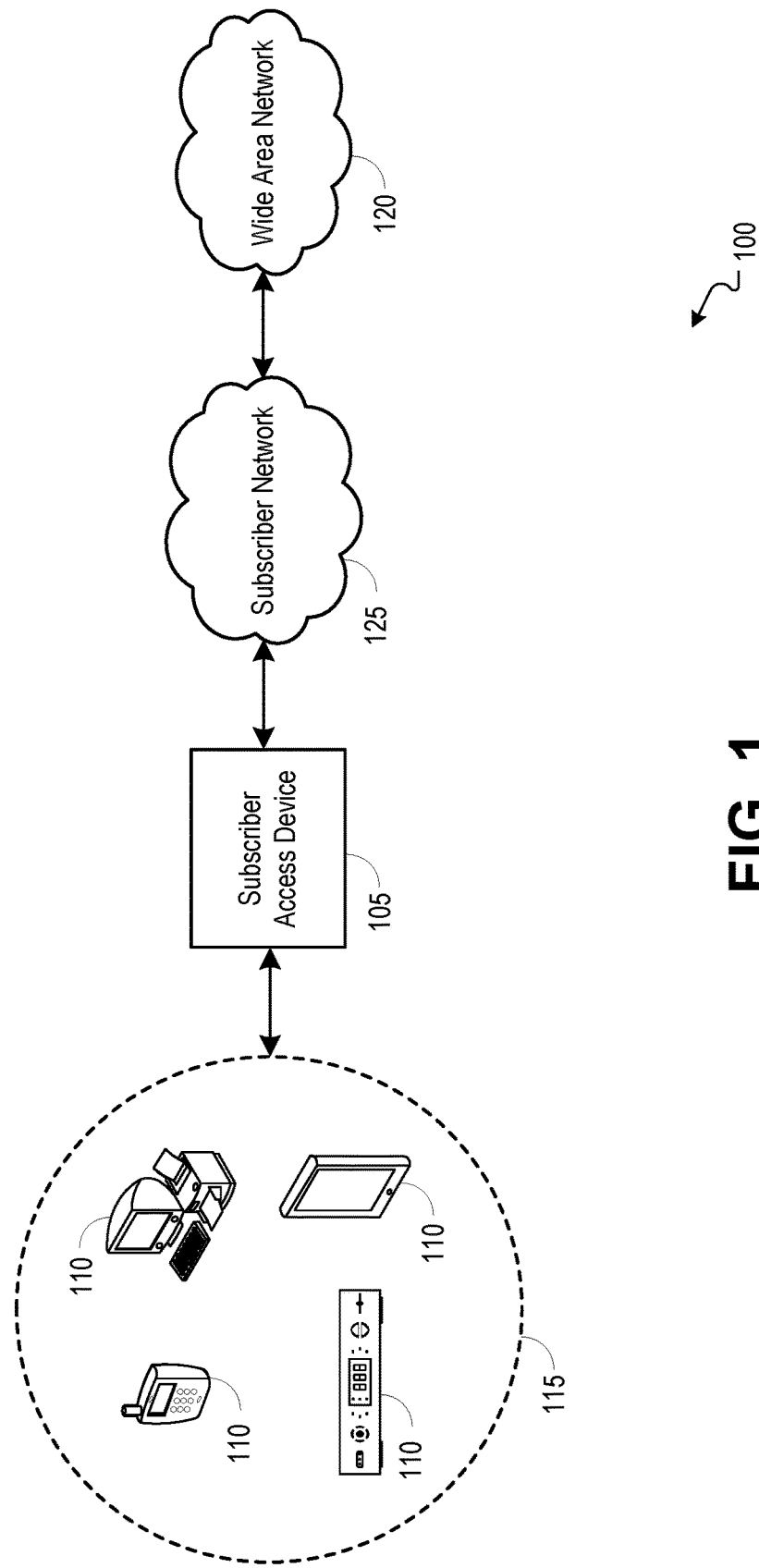
FIG. 1 is a block diagram illustrating an example network environment operable to facilitate the configuration of a device with service set information based upon an identification of a device-type associated with the device.

Methods, systems, and computer readable media can be operable to facilitate the configuration of a device with service set information based upon an identification of a device-type associated with the device. A device-type identifier may be retrieved from a communication that is received from a device requesting a service from an access point. The device-type identifier may be compared to one or more correlations between device-types and service sets that are maintained within a database, and the device may be configured with information for a service set that is correlated with the retrieved device-type identifier, or the device may be configured with information for a default service set. Certain service sets offered by an access point may remain inactive when not in use, and if a device is configured with information for an inactive service set, the access point may automatically enable the service set.

An embodiment of the invention described herein may include a method comprising: (a) receiving a communication from a device; (b) identifying a device-type identifier from the communication, wherein the device-type identifier is associated with the device; (c) determining a service set associated with the device-type identifier; and (d) outputting configuration information associated with the determined service set to the device.

According to an embodiment of the invention, determining a service set associated with the device-type identifier comprises: (a) comparing the device-type identifier to one or more device-type identifiers that are stored within a database, wherein the database comprises a correlation between each respective one of the one or more device-type identifiers and a service set; and (b) if a device-type identifier matching the device-type identifier associated with the device is found, identifying the service set correlated with the device-type identifier as the service set associated with the device-type identifier that is associated with the device.

According to an embodiment of the invention, each respective one of the one or more device-type identifiers is correlated with a service set that is designated for providing a service that is anticipated to be requested by the respective device-type.

According to an embodiment of the invention, determining a service set associated with the device-type identifier comprises: (a) comparing the device-type identifier to one or more device-type identifiers that are stored within a database, wherein the database comprises a correlation between each respective one of the one or more device-type identifiers and a service set; and (b) if a device-type identifier matching the device-type identifier associated with the device is not found, identifying a default service set as the service set associated with the device-type identifier that is associated with the device.

According to an embodiment of the invention, determining a service set associated with the device-type identifier comprises: (a) comparing the device-type identifier to one or more device-type identifiers that are stored within a database, wherein the database comprises a correlation between each respective one of the one or more device-type identifiers and a service; and (b) if a device-type identifier matching the device-type identifier associated with the device is found, identifying the service correlated with the device-type identifier and identifying a service set associated with the identified service as the service set associated with the device-type identifier that is associated with the device.

According to an embodiment of the invention, the method described herein further comprises: (a) determining that the determined service set is not active; and (b) activating the determined service set after outputting configuration information associated with the determined service set to the device.

According to an embodiment of the invention, the communication comprises a wireless provisioning services message.

An embodiment of the invention described herein may include an apparatus comprising: (a) one or more interfaces configured to be used to receive a communication from a device; and (b) one or more modules configured to: (i) identify a device-type identifier from the communication, wherein the device-type identifier is associated with the device; and (ii) determine a service set associated with the device-type identifier; and (c) wherein the one or more interfaces are further configured to be used to output configuration information associated with the determined service set to the device.

According to an embodiment of the invention, the one or more modules are further configured to: (a) determine that the determined service set is not active; and (b) activate the determined service set after outputting configuration information associated with the determined service set to the device.

An embodiment of the invention described herein may include one or more non-transitory computer readable media having instructions operable to cause one or more processors to perform the operations comprising: (a) receiving a communication from a device; (b) identifying a device-type identifier from the communication, wherein the device-type identifier is associated with the device; (c) determining a service set associated with the device-type identifier; and (d) outputting configuration information associated with the determined service set to the device.

According to an embodiment of the invention, the instructions are further operable to cause the one or more processors to perform the operations comprising: (a) determining that the determined service set is not active; and (b) activating the determined service set after outputting configuration information associated with the determined service set to the device.

FIG. 1 is a block diagram illustrating an example network environment 100 operable to facilitate the configuration of a device with service set information based upon an identification of a device-type associated with the device. In embodiments, a subscriber access device 105 can route communications to and from one or more client devices 110. For example, the one or more client devices 110 can be provisioned to receive video service(s), data service(s), voice service(s), and/or home security service(s) through one or more subscriber access devices 105. In embodiments, a subscriber access device 105 can include a gateway, a cable modem, a wireless router including an embedded cable modem, a mobile hot-spot router, a multimedia over coaxial alliance (MoCA) node, a wireless extender, and any access point or other device that is operable to route communications to and from a client device 110.

In embodiments, client devices 110 can include a wide variety of devices such as televisions, mobile devices, tablets, set-top boxes, computers, telephones, security devices, and any other device that is capable of utilizing a wireless video, data, telephony, or security service. In embodiments, a subscriber access device 105 can provide one or more service sets (e.g., primary service set(s), subordinate service set(s), guest service set(s), data service set(s), video service set(s), etc.), and the service sets can be identified using unique service set identifiers (SSID) and/or an inclusion of an interworking informational element in an advertisement of the capabilities for the service set. For example, the subscriber access device 105 may advertise an available service set by outputting a radio signal including an SSID associated with the service set and other information that may be used by a client device 105 to join the service set. One or more subscriber access devices 105 may provide a local network 115 (e.g., local area network (LAN), wireless local area network (WLAN), personal area network (PAN), etc.) for carrying communications between the subscriber access device(s) 105 and one or more associated client devices 110.

In embodiments, a client device 110 can identify a service set that is advertised by a subscriber access device 105, and the client device 110 may be configured to utilize the identified service set provided by the subscriber access device 105. Once a client device 110 is configured for communicating with a subscriber access device 105 through an identified service set, the client device 110 can receive content and/or services from upstream networks or servers (e.g., wide area network (WAN) 120), and can communicate with other client devices 110 connected through the same service set if the service set is configured to allow such a communication.

In embodiments, a subscriber access device 105 can route communications between client device(s) 110 and a WAN 120 via a subscriber network 125. The subscriber network 125 can include various networks such as Ethernet (e.g., CAT5/CAT6), coaxial cable, optical fiber, twisted pair network, satellite networks, mobile networks including 4G and LTE, and others.

Once authenticated with a service set offered by a subscriber access device 105, a client device 110 may communicate with the subscriber access device 105 over a wireless channel associated with the subscriber access device 105. For example, a requested service (e.g., data, video, telephony, home security, etc.) may be provided to a client device 110 using bandwidth available on the wireless channel. It will be appreciated by those skilled in the relevant art that with each additional client device 110 requesting a service through the subscriber access device 105, additional bandwidth on the wireless channel is consumed, and that the bandwidth consumed will vary with each service.

In embodiments, a database may be integrated into the subscriber access device 105 or into an external registrar which can identify device-types according to specific services that are likely or expected to be accessed by the device-type. For example, each of one or more device-types may be associated with an appropriate service set that is designated for providing a service that is likely to be or that is typically requested by the device-type (e.g., video services may be provided over a service set designated for video services, data services may be provided over a service set designated for data services, home security services may be provided over a service set designated for home security services, etc.). One or more primary or default service set(s) may be used to deliver primary services (e.g., private, encrypted communications, gaming, video, home security, etc.), and one or more subordinate service set(s) may be used to deliver subordinate services (e.g., public, unencrypted or encrypted network communications and other optional services). The database may be maintained by a subscriber, technician, or service provider via a set of configuration utilities.

In embodiments, a client device 110 (i.e., enrollee or station) may initiate a communication exchange with the subscriber access device 105 or an associated access point. As an example, the communication exchange may be initiated per the Wireless Simple Configuration (WSC) specification, utilizing either the Push Button Configuration (PBC) (either soft or hard push button) or PIN method configuration methods. The subscriber access device 105 or associated access point may act as a proxy for the client device 110. It should be understood that the communication exchange (e.g., Wi-Fi protected setup (WPS)) may originate from either the subscriber access device 105 or the client device 110, and either the Push Button Method or PIN method may be utilized. In embodiments, the subscriber access device 105 may advertise support for WPS/WSC of only a single service (i.e., a default or private data service set). It will be appreciated by those skilled in the relevant art that when a WPS service is invoked, the exchange of communications between the subscriber access device 105 and client device 110 may follow the messaging format per the Wi-Fi Alliance Specification or other wireless standard.

In embodiments, a communication received at the subscriber access device 105 from a client device 110 may include a device-type identifier or element. The device-type may serve to identify the client device 110 (i.e., enrollee) and may be compared to one or more entries in the database that associates service sets with device-types. If the device type does not match any of the types supported by non-primary services, then the client device 110 may be configured to match a primary or default service. Otherwise, the client device 110 may be configured to match a non-primary service. A database entry associating a device-type with a service may include a corresponding service type which is then linked to a specific service set (e.g., WLAN BSS) and corresponding configuration information, the configuration information including information such as a service set identifier (SSID), authentication type, encryption type, passphrase or pre shared key, and/or others. The client device 110 may then be configured with the appropriate configuration information utilizing WLAN configuration commands.

In embodiments, configuration of a client device 110 (i.e., the enrollee) may be carried out by an access point and a registrar. It should be understood that the access point and registrar may be located within separate devices or a common device (e.g., subscriber access device 105). It will be appreciated that the enrollee and access point may communicate over various standards or protocols, including, but not limited to 802.11. Likewise, it will be appreciated that the access point and registrar may communicate over various standards such as universal plug and play (UPnP), and others. The enrollee may pass device type information to the registrar (via the access point) and the registrar may respond by passing service configuration information to the enrollee (via the access point). In embodiments, a server external to the registrar (e.g., device type to service association database) may provide information for associating an identified device type with a specific service, and the registrar can then determine the service configuration information to send to the enrollee based upon the identified service type.

In embodiments, a service set may remain inactive until a client device 110 is configured and associated with a service which corresponds with the particular service set. When a client device 110 is configured with information associated with an inactive service set, the subscriber access device 105, or associated access point, may automatically enable the service set.

A database maintained in memory at the subscriber access device 105 may include associations between services, service sets, and device-types. The database may be configured via a set of factory default values, or via another configuration schema (simple network management protocol (SNMP), TR69, WebGUI (web graphical user interface), etc.). In embodiments, a wireless provisioning service (WPS) activation may be utilized to activate a service set when the first station (as defined in the IEEE Standard) joins the service corresponding to the service set. For example, the WPS operation may be passed as a message to the subscriber access device 105 (via Wi-Fi specifications) and the message may include a device-type identifier. The subscriber access device 105 may correlate the device-type identifier to a particular service (e.g., video service, home security service, data service, voice service, etc.). The service may contain as part of its information, a specific service set offered by the subscriber access device 105 which supports the service. When this correlation is made, the subscriber access device 105 may ascertain the status of the identified service set (i.e., active or inactive). If the service set is inactive, the message received by the subscriber access device 105 may act as a signal to activate the service set after the client device 110 has been configured via the wireless simple configuration (WSC) service.

In embodiments, the subscriber access device 105 may determine whether a device-type identifier matches a device-type identifier that is associated with a special service set (e.g., a service set other than a default or primary service set offered by the subscriber access device 105 or associated access point). If the device-type identifier does not match a device-type identifier that is associated with a special service set, the client device 110 from which the device-type identifier was received may be configured to a default service set (e.g., via WSC). If the device-type identifier does match a device-type identifier that is associated with a special service set, the client device 110 may be configured to the special service set (e.g., via WSC). The subscriber access device 105 may then determine whether the special service set is currently active. If the special service set is not currently active, the subscriber access device 105 may initiate an activation of the special service set.

In embodiments, a subscriber access device 105 may be configured to automatically enable a service set that is associated with a particular service. When a device-type identifier is received from a client device 110 that is requesting access to a service set provided by the subscriber access device 105, a particular service associated with the device-type may be identified from a device-type to service association database. For example, the subscriber access device, or external service set activation service, may identify a service that is correlated with the received device-type identifier and may access a service type to service set association database to identify any correlation of the service type to a specific or special service set. The client device 110 may then be configured to the specific or special service set, and if the service set is not active, the subscriber access device 105 may initiate an activation of the service set.

Figure 2:
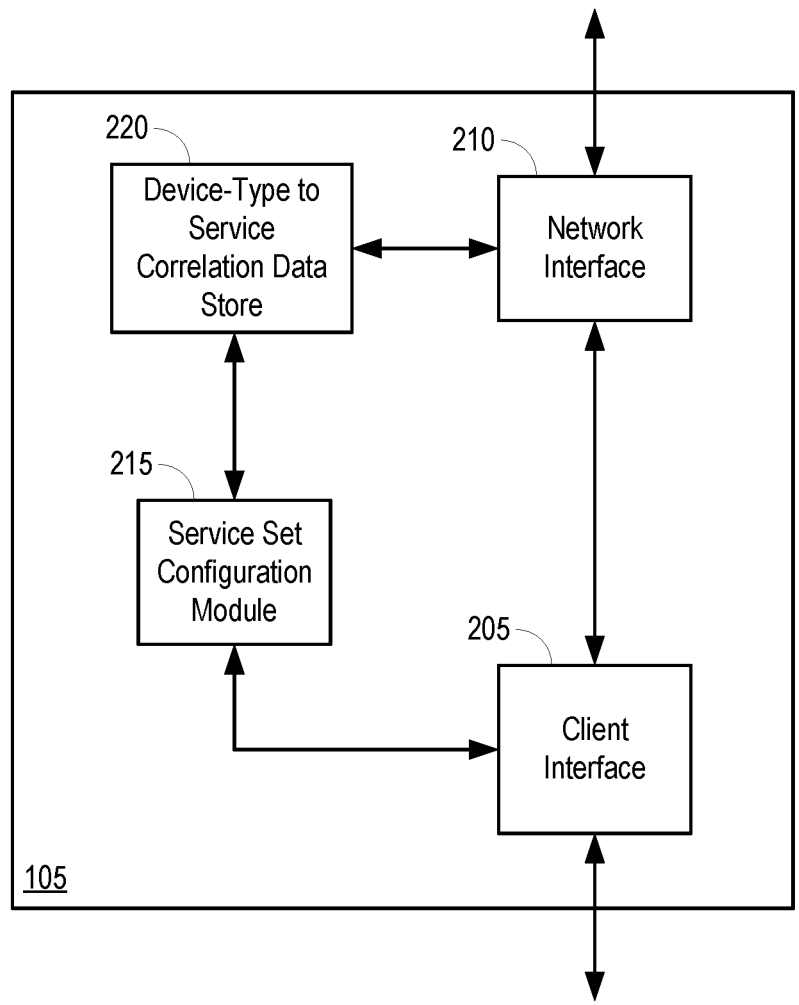
FIG. 2 is a block diagram illustrating an example subscriber access device operable to facilitate the configuration of a device with service set information based upon an identification of a device-type associated with the device.

FIG. 2 is a block diagram illustrating an example subscriber access device 105 operable to facilitate the configuration of a device with service set information based upon an identification of a device-type associated with the device. The subscriber access device 105 may include a client interface 205, a network interface 210, a service set configuration module 215, and a device-type to service correlation data store 220. The subscriber access device 105 may provide one or more services to one or more client devices 110, and one or more services may be received at the subscriber access device 105 from an upstream network or local network through the network interface 210. Communications between the subscriber access device 105 and one or more client devices 110 may be output from or received through the client interface 205. The client interface 205 may include a receiver and/or transmitter configured to output and receive wireless communications (e.g., 802.11 communications) over one or more wireless networks.

In embodiments, the subscriber access device 105 may route communications to and from client devices 110 through one or more service sets and one or more of the service sets may be designated for the provision of one or more services. For example, the subscriber access device 105 may offer a plurality of service sets wherein each of one or more of the plurality of service sets is designated for the provisioning of a certain service (e.g., data, video, telephony, guest or public network services, home security services, etc.).

In embodiments, a device-type to service correlation data store 220 may store correlations between service sets and types of devices that are likely or expected to be accessed by the device-type. For example, each of one or more device-types may be associated with an appropriate service set that is designated for providing a service that is likely to be or that is typically requested by the device-type (e.g., video services may be provided over a service set designated for video services, data services may be provided over a service set designated for data services, home security services may be provided over a service set designated for home security services, etc.). The device-type to service correlation data store 220 may store correlations between device-types and services and correlations between services and service sets. The device-type to service correlation data store 220 may be configured via a set of factory default values, or via another configuration schema (simple network management protocol (SNMP), TR69, WebGUI, etc.).

In embodiments, a communication exchange may be initiated between a client device 110 and the subscriber access device 105 or an associated access point. As an example, the communication exchange may be initiated per the Wireless Simple Configuration (WSC) specification, utilizing either the Push Button Configuration (PBC) (either soft or hard push button) or PIN method configuration methods.

In embodiments, a communication received at the subscriber access device 105 from a client device 110 may include a device-type identifier or element. The service set configuration module 215 may retrieve the device-type identifier from the received communication and may compare the identifier to one or more entries in the device-type to service correlation data store 220. If the device-type identifier does not match any of the device-types supported by non-primary services, then the service set configuration module 215 may configure the client device 110 to match a primary or default service set. Otherwise, the service set configuration module 215 may configure the client device 110 to match a non-primary service set as identified from the device-type to service correlation data store 220. For example, the service set configuration module 215 may determine configuration information for a service set that is associated with the device-type identifier. The configuration information may include information such as a service set identifier (SSID), authentication type, encryption type, passphrase or pre shared key, and/or others. The service set configuration module 215 may then initiate a configuration of the client device 110 utilizing WLAN configuration commands.

In embodiments, the service set configuration module 215 may be configured to automatically enable a service set that is associated with a particular service. When a device-type identifier is received from a client device 110 that is requesting access to a service set provided by the subscriber access device 105, the service set configuration module 215 may identify a particular service associated with the device-type from the device-type to service correlation data store 220. The service set configuration module 215 may then determine a service set that is associated with the identified service based on a correlation between the service and service set as identified from the device-type to service correlation data store. The service set configuration module 215 may then initiate a configuration of the client device 110 to the specific or special service set.

In embodiments, a service set offered by the subscriber access device 105 may remain inactive until a client device 110 is configured and associated with a service which corresponds with the particular service set. When a client device 110 is configured with information associated with an inactive service set, the subscriber access device 105, or associated access point, may automatically enable the service set. For example, when a client device 110 is configured with information for a special service set as determined based upon a determined association between a device-type identifier and a corresponding service set, the service set configuration module 215 may ascertain the status of the identified service set (i.e., active or inactive). If the service set is inactive, the message received by the service set configuration module 215 may act as a signal to activate the service set after the client device 110 has been configured via a wireless simple configuration (WSC) service.

Figure 3:
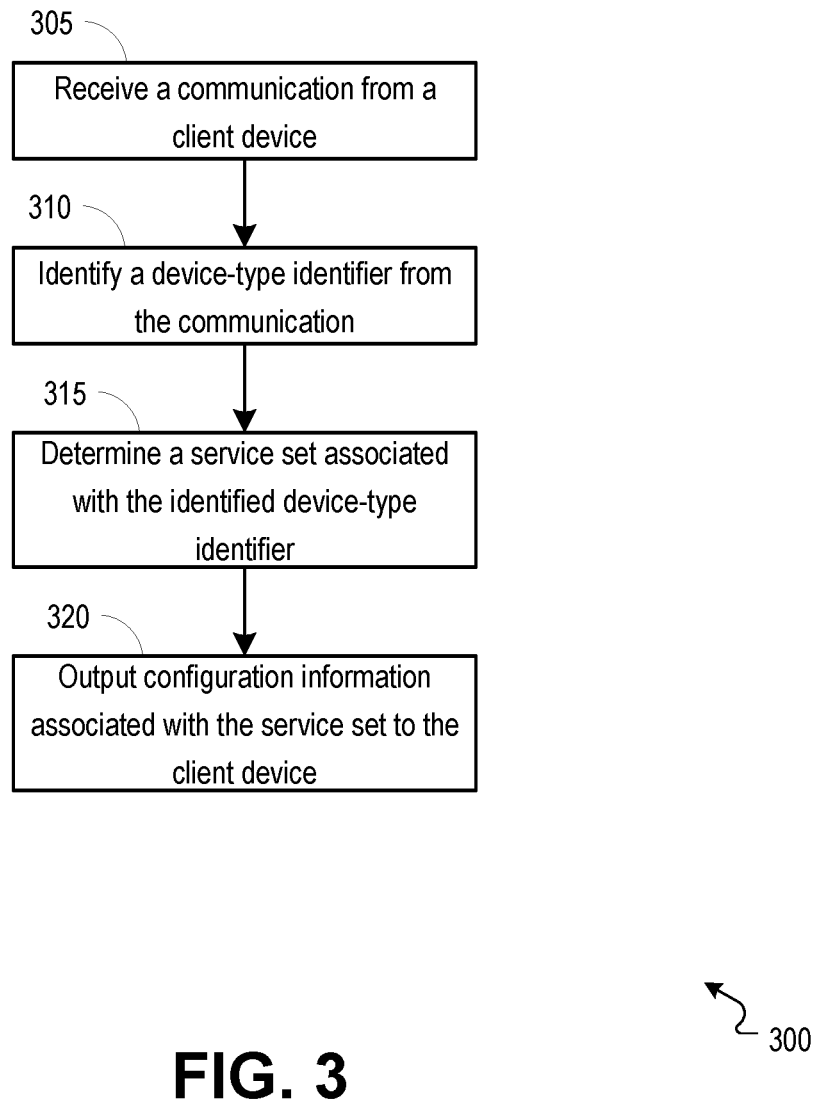
FIG. 3 is a flowchart illustrating an example process operable to facilitate the configuration of a device with information for a service set that is associated with the type of device.

FIG. 3 is a flowchart illustrating an example process 300 operable to facilitate the configuration of a device with information for a service set that is associated with the type of device. In embodiments, the process 300 may be carried out by a subscriber access device 105 of FIG. 1 or a remote server (e.g., registrar external to an access point or other server configured to store associations between service sets and device-types). The process 300 may start at 305, when a communication is received from a device. The communication may be a communication that is transmitted from a client device 110 of FIG. 1 during an attempt by the client device 110 to associate with a subscriber access device 105. For example, the communication may be a message requesting access to a service set (e.g., default service set) provided by the subscriber access device 105, and the communication may be output from the client device 110 in response to the initiation of a wireless configuration process (e.g., push button configuration or PIN method configuration per the wireless simple configuration (WSC) specification or other specification).

At 310, a device-type identifier may be identified from the communication. A device-type identifier may be identified, for example, by a subscriber access device 105 (e.g., by a service set configuration module 215 of FIG. 2). In embodiments, the device-type identifier may be a component of the received communication that identifies the type of device from which the communication was received. It should be understood that the device-type identifier may be any type of identifier, including, but not limited to, a text-based description of the device-type, a numerical or alphanumerical description of the device-type, a code-word associated with the device-type, and others.

At 315, a service set associated with the identified device-type may be determined. The service set associated with the identified device-type may be determined, for example, by the subscriber access device 105 (e.g., by the service set configuration module 215) or a registrar or server external to the access device 105. The subscriber access device 105 may be configured to provide certain services over certain predetermined service sets, and the subscriber access device 105 may determine a type of service that will be delivered, or that will most likely be delivered, to a client device based upon the device-type associated with the client device. In embodiments, the identified device-type identifier may be compared to identifiers within a group of device-type identifiers (e.g., group of device-type identifiers stored at the device-type to service correlation data store 220 of FIG. 2), wherein each identifier within the group of device-type identifiers is associated with one or more service sets. The determination may be made that the device from which the communication was received is to be configured to communicate via the determined service set (i.e., the service set associated with an identifier matching the device-type identifier retrieved from the received communication).

At 320, configuration information associated with the service set may be transmitted to the client device. Configuration information may be output from a subscriber access device 105 (e.g., by the service set configuration module 215 through the client interface 205 of FIG. 2) to the client device from which the communication was received. In embodiments, the configuration information may include an identification of a specific WLAN BSS and corresponding SSID, authentication type, encryption type, and passphrase or pre-shared key. The configuration information associated with the service set may be stored at the subscriber access device 105 (e.g., at the device-type to service correlation data store 220) or at an external registrar or server. The client device may be configured for communicating over the determined service set through an exchange of WLAN configuration commands between the subscriber access device 105 or proxy access point, and the client device.

Figure 4:
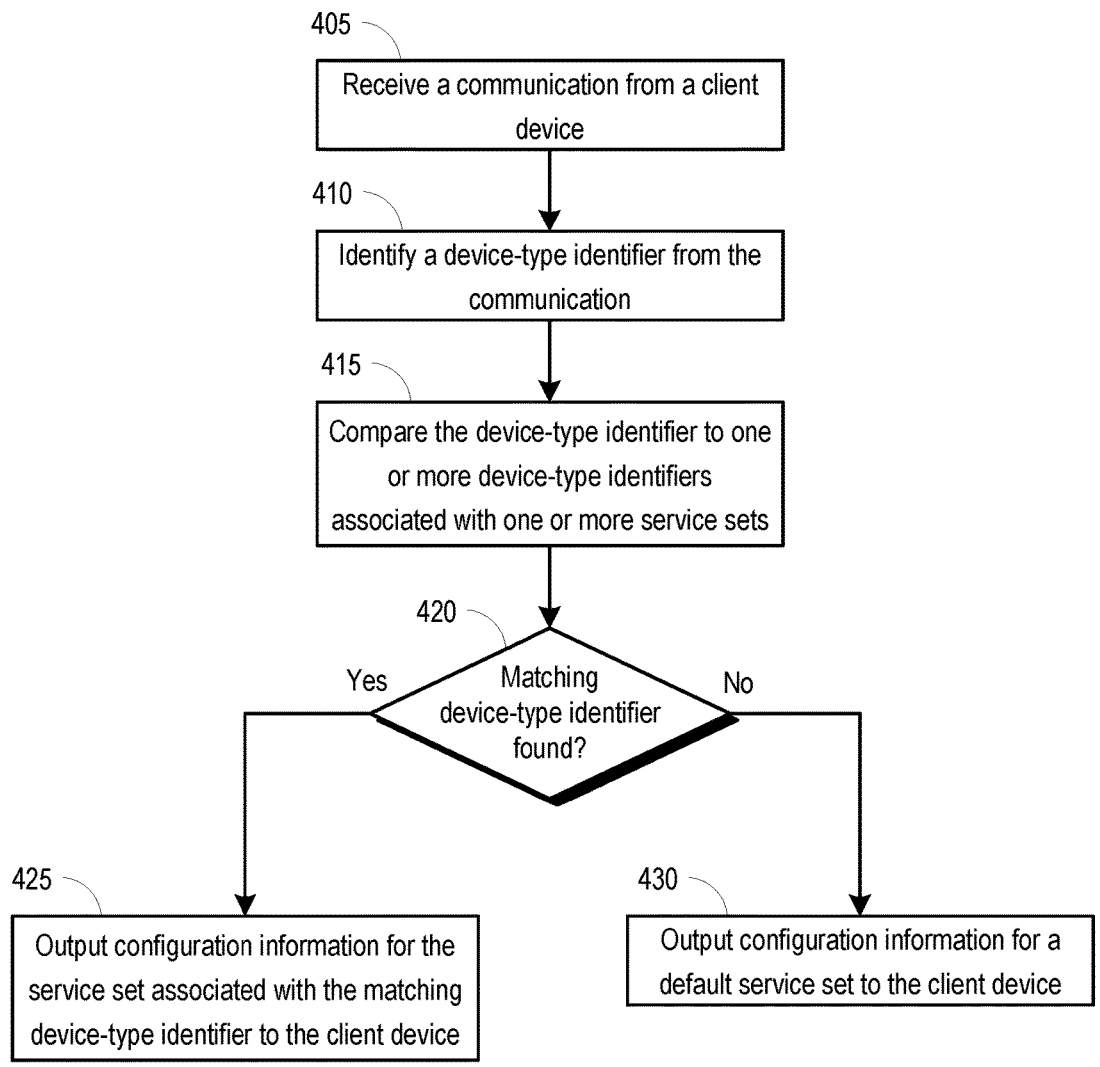
FIG. 4 is a flowchart illustrating an example process operable to facilitate the configuration of a device with information for a service set based upon a comparison between a device-type associated with the device and one or more device-type identifiers associated with one or more service sets.

FIG. 4 is a flowchart illustrating an example process 400 operable to facilitate the configuration of a device with information for a service set based upon a comparison between a device-type associated with the device and one or more device-type identifiers associated with one or more service sets. In embodiments, the process 400 may be carried out by a subscriber access device 105 of FIG. 1 or a remote server (e.g., registrar external to an access point or other server configured to store associations between service sets and device-types). The process 400 may start at 405, when a communication is received from a device. The communication may be a communication that is transmitted from a client device 110 of FIG. 1 during an attempt by the client device 110 to associate with a subscriber access device 105. For example, the communication may be a message requesting access to a service set (e.g., default service set) provided by the subscriber access device 105, and the communication may be output from the client device 110 in response to the initiation of a wireless configuration process (e.g., push button configuration or PIN method configuration per the wireless simple configuration (WSC) specification or other specification).

At 410, a device-type identifier may be identified from the communication. A device-type identifier may be identified, for example, by a subscriber access device 105 (e.g., by a service set configuration module 215 of FIG. 2). In embodiments, the device-type identifier may be a component of the received communication that identifies the type of device from which the communication was received. It should be understood that the device-type identifier may be any type of identifier, including, but not limited to, a text-based description of the device-type, a numerical or alphanumerical description of the device-type, a code-word associated with the device-type, and others.

At 415, the device-type identifier may be compared to one or more device-type identifiers that are associated with one or more service sets. The comparison between the device-type identifier and one or more device-type identifiers that are associated with one or more service sets may be made, for example, by a service set configuration module 215 of FIG. 2. In embodiments, the identified device-type identifier may be compared to identifiers within a group of device-type identifiers (e.g., group of device-type identifiers stored at the device-type to service correlation data store 220 of FIG. 2), wherein each identifier within the group of device-type identifiers is associated with one or more service sets. For example, a subscriber access device 105 may be configured with multiple service sets, and each of one or more of the multiple service sets may be dedicated to providing a certain service (e.g., video, data, voice, security, etc.). Each of the one or more service sets may be associated with one or more device-types that may be expected or anticipated to use a corresponding service.

At 420, a determination may be made whether the identified device-type identifier matches any of the one or more stored device-type identifiers that are associated with one or more service sets. The determination whether a matching device-type identifier is found amongst the one or more stored device-type identifiers that are associated with one or more service sets may be made, for example, by a service set configuration module 215 of FIG. 2. In embodiments, the service set configuration module 215 may search a list of device-type identifiers (e.g., device-type identifiers stored at a device-type to service correlation data store 220 of FIG. 2) for a device-type identifier that matches the device-type identifier that was identified from the received communication.

If, at 420, a matching device-type identifier is found, the process 400 may proceed to 425. At 425, configuration information for a service set associated with the matching device-type identifier may be output to the client device. When a matching device-type identifier is found, the determination may be made that the device from which the communication was received is to be configured to communicate via the service set associated with the matching device-type identifier. Configuration information may be output from a subscriber access device 105 (e.g., by the service set configuration module 215 through the client interface 205 of FIG. 2) to the client device from which the communication was received. In embodiments, the configuration information may include an identification of a specific WLAN BSS and corresponding SSID, authentication type, encryption type, and passphrase or pre-shared key. The configuration information associated with the service set may be stored at the subscriber access device 105 (e.g., at the device-type to service correlation data store 220) or at an external registrar or server. The client device may be configured for communicating over the determined service set through an exchange of WLAN configuration commands between the subscriber access device 105 or proxy access point, and the client device.

If, at 420, a matching device-type identifier is not found, the process 400 may proceed to 430. At 430, configuration information for a default service set may be output to the client device. When a matching device-type identifier is not found, the determination may be made that the subscriber access device 105 is not configured with a certain service set that is dedicated to serving the device from which the communication was received. Therefore, the device may be configured to communicate with the subscriber access device 105 via a default service set. Configuration information may be output from a subscriber access device 105 (e.g., by the service set configuration module 215 through the client interface 205 of FIG. 2) to the client device from which the communication was received. In embodiments, the configuration information may include an identification of a specific WLAN BSS and corresponding SSID, authentication type, encryption type, and passphrase or pre-shared key. The configuration information associated with the default service set may be stored at the subscriber access device 105 (e.g., at the device-type to service correlation data store 220) or at an external registrar or server. The client device may be configured for communicating over the default service set through an exchange of WLAN configuration commands between the subscriber access device 105 or proxy access point, and the client device.

Figure 5:
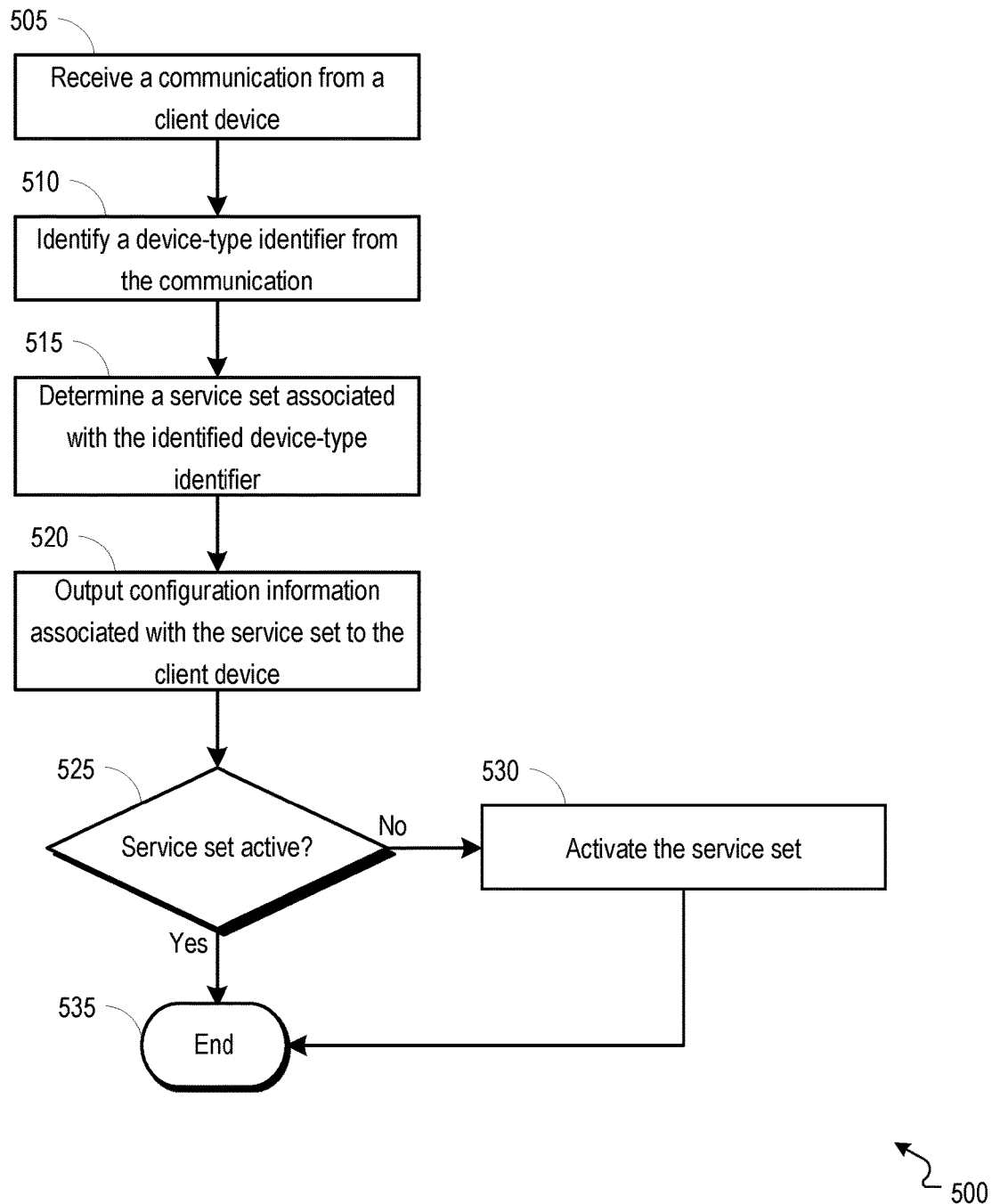
FIG. 5 is a flowchart illustrating an example process operable to facilitate the activation of a service set that is associated with a certain device-type.

FIG. 5 is a flowchart illustrating an example process 500 operable to facilitate the activation of a service set that is associated with a certain device-type. In embodiments, the process 500 may be carried out by a subscriber access device 105 of FIG. 1 or a remote server (e.g., registrar external to an access point or other server configured to store associations between service sets and device-types). The process 500 may start at 505, when a communication is received from a device. The communication may be a communication that is transmitted from a client device 110 of FIG. 1 during an attempt by the client device 110 to associate with a subscriber access device 105. For example, the communication may be a message requesting access to a service set (e.g., default service set) provided by the subscriber access device 105, and the communication may be output from the client device 110 in response to the initiation of a wireless configuration process (e.g., push button configuration or PIN method configuration per the wireless simple configuration (WSC) specification or other specification).

At 510, a device-type identifier may be identified from the communication. A device-type identifier may be identified, for example, by a subscriber access device 105 (e.g., by a service set configuration module 215 of FIG. 2). In embodiments, the device-type identifier may be a component of the received communication that identifies the type of device from which the communication was received. It should be understood that the device-type identifier may be any type of identifier, including, but not limited to, a text-based description of the device-type, a numerical or alphanumerical description of the device-type, a code-word associated with the device-type, and others.

At 515, a service set associated with the identified device-type may be determined. The service set associated with the identified device-type may be determined, for example, by the subscriber access device 105 (e.g., by the service set configuration module 215) or a registrar or server external to the access device 105. The subscriber access device 105 may be configured to provide certain services over certain predetermined service sets, and the subscriber access device 105 may determine a type of service that will be delivered, or that will most likely be delivered, to a client device based upon the device-type associated with the client device. In embodiments, the identified device-type identifier may be compared to identifiers within a group of device-type identifiers (e.g., group of device-type identifiers stored at the device-type to service correlation data store 220 of FIG. 2), wherein each identifier within the group of device-type identifiers is associated with one or more service sets. The determination may be made that the device from which the communication was received is to be configured to communicate via the determined service set (i.e., the service set associated with an identifier matching the device-type identifier retrieved from the received communication).

At 520, configuration information associated with the service set may be output to the client device. Configuration information may be output from a subscriber access device 105 of FIG. 1 (e.g., by the service set configuration module 215 through the client interface 205 of FIG. 2) to the client device from which the communication was received. In embodiments, the configuration information may include an identification of a specific WLAN BSS and corresponding SSID, authentication type, encryption type, and passphrase or pre-shared key. The configuration information associated with the service set may be stored at the subscriber access device 105 (e.g., at the device-type to service correlation data store 220) or at an external registrar or server. The client device may be configured for communicating over the determined service set through an exchange of WLAN configuration commands between the subscriber access device 105 or proxy access point, and the client device.

At 525, a determination may be made whether the determined service set is active. The determination whether the service set is active may be made, for example, by a service set configuration module 215 of FIG. 2. An active service set may include a service set that is externally visible to one or more client devices. In other words, an active service set may be a service set that is actively transmitting. Internal databases may be maintained at a subscriber access device 105 of FIG. 1, the databases including information associated with each advertised service set and a current status of each advertised service set (i.e., whether the respective service set is actively transmitting).

If, at 525, the determination is made that the determined service set is not active, the process 500 may proceed to 530. At 530, the determined service set may be activated. The determined service set may be activated, for example, by a service set configuration module 215 of FIG. 2. In embodiments, various resources and/or components of a subscriber access device 105 of FIG. 1 that are dedicated to providing one or more particular services via a particular service set (i.e., the determined service set) may be disabled while the service set is not in use. When a communication is received from a device of a type that is associated with the particular service set, and the particular service set is not active, the subscriber access device 105 may enable the various resources and/or components of the particular service set to activate the offering of the particular service set.

If, at 525, the determination is made that the determined service set is active, the process 500 may end at 535.

Figure 6:
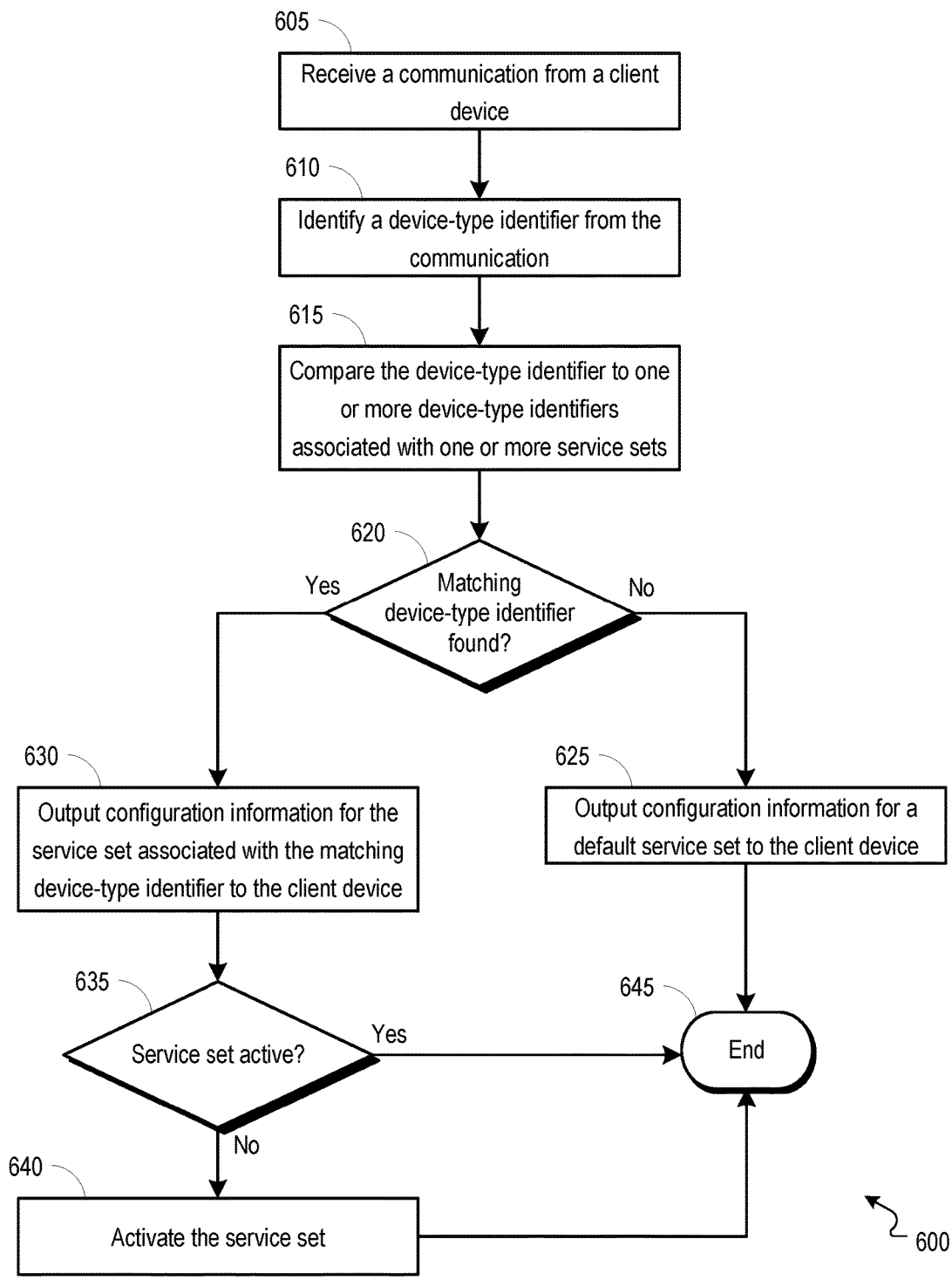
FIG. 6 is a flowchart illustrating an example process operable to facilitate the activation of a service set based upon a comparison between a device-type associated with a device and one or more device-type identifiers associated with one or more service sets.

FIG. 6 is a flowchart illustrating an example process 600 operable to facilitate the activation of a service set based upon a comparison between a device-type associated with a device and one or more device-type identifiers associated with one or more service sets. In embodiments, the process 600 may be carried out by a subscriber access device 105 of FIG. 1 or a remote server (e.g., registrar external to an access point or other server configured to store associations between service sets and device-types). The process 600 may start at 605, when a communication is received from a device. The communication may be a communication that is transmitted from a client device 110 of FIG. 1 during an attempt by the client device 110 to associate with a subscriber access device 105. For example, the communication may be a message requesting access to a service set (e.g., default service set) provided by the subscriber access device 105, and the communication may be output from the client device 110 in response to the initiation of a wireless configuration process (e.g., push button configuration or PIN method configuration per the wireless simple configuration (WSC) specification or other specification).

At 610, a device-type identifier may be identified from the communication. A device-type identifier may be identified, for example, by a subscriber access device 105 (e.g., by a service set configuration module 215 of FIG. 2). In embodiments, the device-type identifier may be a component of the received communication that identifies the type of device from which the communication was received. It should be understood that the device-type identifier may be any type of identifier, including, but not limited to, a text-based description of the device-type, a numerical or alphanumerical description of the device-type, a code-word associated with the device-type, and others.

At 615, the device-type identifier may be compared to one or more device-type identifiers that are associated with one or more service sets. The comparison between the device-type identifier and one or more device-type identifiers that are associated with one or more service sets may be made, for example, by a service set configuration module 215 of FIG. 2. In embodiments, the identified device-type identifier may be compared to identifiers within a group of device-type identifiers (e.g., group of device-type identifiers stored at the device-type to service correlation data store 220 of FIG. 2), wherein each identifier within the group of device-type identifiers is associated with one or more service sets. For example, a subscriber access device 105 may be configured with multiple service sets, and each of one or more of the multiple service sets may be dedicated to providing a certain service (e.g., video, data, voice, security, etc.). Each of the one or more service sets may be associated with one or more device-types that may be expected or anticipated to use a corresponding service.

At 620, a determination may be made whether the identified device-type identifier matches any of the one or more stored device-type identifiers that are associated with one or more service sets. The determination whether a matching device-type identifier is found amongst the one or more stored device-type identifiers that are associated with one or more service sets may be made, for example, by a service set configuration module 215 of FIG. 2. In embodiments, the service set configuration module 215 may search a list of device-type identifiers (e.g., device-type identifiers stored at a device-type to service correlation data store 220 of FIG. 2) for a device-type identifier that matches the device-type identifier that was identified from the received communication.

If, at 620, a matching device-type identifier is not found, the process 600 may proceed to 625. At 625, configuration information for a default service set may be output to the client device. When a matching device-type identifier is not found, the determination may be made that the subscriber access device 105 is not configured with a certain service set that is dedicated to serving, or that the subscriber access device 105 is unable to recognize a certain service set that is dedicated to serving the device from which the communication was received. Therefore, the device may be configured to communicate with the subscriber access device 105 via a default service set. Configuration information may be output from a subscriber access device 105 (e.g., by the service set configuration module 215 through the client interface 205 of FIG. 2) to the client device from which the communication was received. In embodiments, the configuration information may include an identification of a specific WLAN BSS and corresponding SSID, authentication type, encryption type, and passphrase or pre-shared key. The configuration information associated with the default service set may be stored at the subscriber access device 105 (e.g., at the device-type to service correlation data store 220) or at an external registrar or server. The client device may be configured for communicating over the default service set through an exchange of WLAN configuration commands between the subscriber access device 105 or proxy access point, and the client device.

If, at 620, a matching device-type identifier is found, the process 600 may proceed to 630. At 630, configuration information for a service set associated with the matching device-type identifier may be output to the client device. When a matching device-type identifier is found, the determination may be made that the device from which the communication was received is to be configured to communicate via the service set associated with the matching device-type identifier. Configuration information may be output from a subscriber access device 105 (e.g., by the service set configuration module 215 through the client interface 205 of FIG. 2) to the client device from which the communication was received. In embodiments, the configuration information may include an identification of a specific WLAN BSS and corresponding SSID, authentication type, encryption type, and passphrase or pre-shared key. The configuration information associated with the service set may be stored at the subscriber access device 105 (e.g., at the device-type to service correlation data store 220) or at an external registrar or server. The client device may be configured for communicating over the determined service set through an exchange of WLAN configuration commands between the subscriber access device 105 or proxy access point, and the client device.

At 635, a determination may be made whether the determined service set is active. The determination whether the service set is active may be made, for example, by a service set configuration module 215 of FIG. 2. An active service set may include a service set that is externally visible to one or more client devices. In other words, an active service set may be a service set that is actively transmitting. Internal databases may be maintained at a subscriber access device 105 of FIG. 1, the databases including information associated with each advertised service set and a current status of each advertised service set (i.e., whether the respective service set is actively transmitting).

If, at 635, the determination is made that the determined service set is not active, the process 600 may proceed to 640. At 640, the determined service set may be activated. The determined service set may be activated, for example, by a service set configuration module 215 of FIG. 2. In embodiments, various resources and/or components of a subscriber access device 105 of FIG. 1 that are dedicated to providing one or more particular services via a particular service set (i.e., the determined service set) may be disabled while the service set is not in use. When a communication is received from a device of a type that is associated with the particular service set, and the particular service set is not active, the subscriber access device 105 may enable the various resources and/or components of the particular service set to activate the offering of the particular service set.

If, at 635, the determination is made that the determined service set is active, the process 600 may end at 645.

Figure 7:
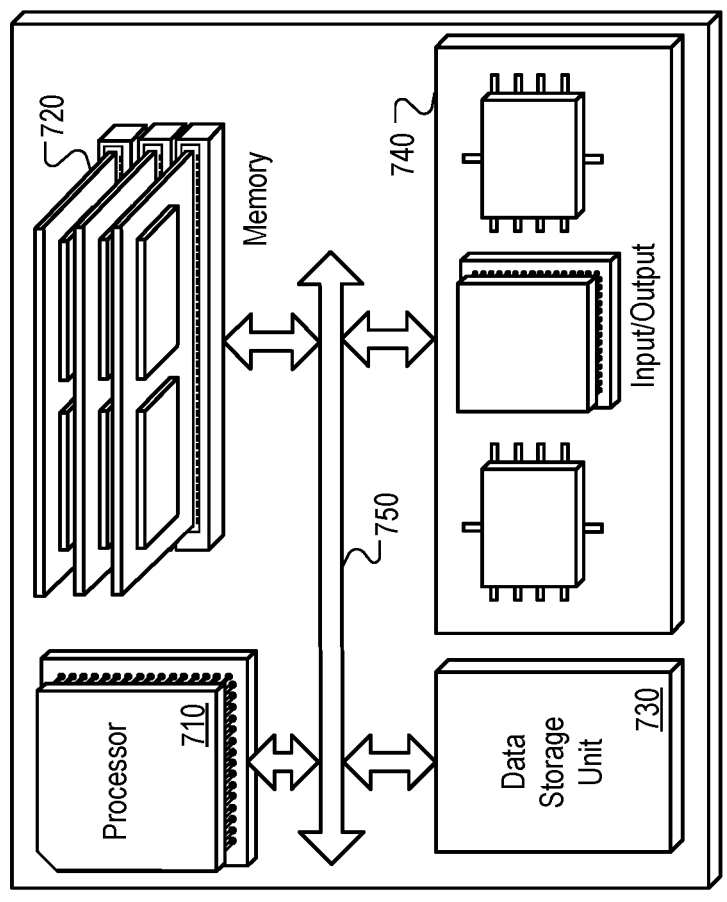
FIG. 7 is a block diagram of a hardware configuration operable to facilitate the configuration of a device with service set information based upon an identification of a device-type associated with the device.

FIG. 7 is a block diagram of a hardware configuration 700 operable to facilitate the configuration of a device with service set information based upon an identification of a device-type associated with the device. It should be understood that the hardware configuration 700 can exist in various types of devices. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In embodiments, the input/output device 740 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., subscriber network 125 of FIG. 1, WAN 120 of FIG. 1, local network 115 of FIG. 1, etc.) and/or one or more client devices (e.g., client devices 110 of FIG. 1) via one or more service sets. It should be understood that the communications protocols described herein are only examples and that various other inter-chip communication protocols may be used to support the methods, systems, and computer readable media described herein.

Those skilled in the art will appreciate that the invention improves upon methods and apparatuses for configuring devices with service set information. Methods, systems, and computer readable media can be operable to facilitate the configuration of a device with service set information based upon an identification of a device-type associated with the device. A device-type identifier may be retrieved from a communication that is received from a device requesting a service from an access point. The device-type identifier may be compared to one or more correlations between device-types and service sets that are maintained within a database, and the device may be configured with information for a service set that is correlated with the retrieved device-type identifier, or the device may be configured with information for a default service set. Certain service sets offered by an access point may remain inactive when not in use, and if a device is configured with information for an inactive service set, the access point may automatically enable the service set.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
receiving a communication from a device, wherein the communication comprises a device-type identifier that is associated with a type of device from which the communication is received;
identifying the device-type identifier from the communication, wherein the device-type identifier identifies a type of device from which the communication is received;
determining a service set associated with the type of device identified by the device-type identifier, wherein determining a service set associated with the type of device identified by the device-type identifier comprises:
comparing the device-type identifier to one or more device-type identifiers that are stored within a database, wherein each of the one or more device-type identifiers is associated with a certain type of device, and wherein the database comprises a correlation between each respective one of the one or more device-type identifiers and a service set; and
if a device-type identifier matching the device-type identifier associated with the device is found, identifying the service set correlated with the device-type identifier as the service set associated with the type of device identified by the device-type identifier that is associated with the device; and
outputting configuration information associated with the determined service set to the device.

2. The method of claim 1, wherein each respective one of the one or more device-type identifiers is correlated with a service set that is designated for providing a service that is anticipated to be requested by the respective device-type.

3. The method of claim 1, wherein determining a service set associated with the type of device identified by the device-type identifier comprises:
comparing the device-type identifier to one or more device-type identifiers that are stored within a database, wherein the database comprises a correlation between each respective one of the one or more device-type identifiers and a service set; and
if a device-type identifier matching the device-type identifier associated with the device is not found, identifying a default service set as the service set associated with the type of device identified by the device-type identifier that is associated with the device.

4. The method of claim 1, wherein determining a service set associated with the type of device identified by the device-type identifier comprises:
comparing the device-type identifier to one or more device-type identifiers that are stored within a database, wherein the database comprises a correlation between each respective one of the one or more device-type identifiers and a service; and
if a device-type identifier matching the device-type identifier associated with the device is found, identifying the service correlated with the device-type identifier and identifying a service set associated with the identified service as the service set associated with the type of device identified by the device-type identifier that is associated with the device.

5. The method of claim 1, further comprising:
determining that the determined service set is not active; and
activating the determined service set after outputting configuration information associated with the determined service set to the device.

6. The method of claim 1, wherein the communication comprises a wireless provisioning services message.

7. An apparatus comprising:
one or more interfaces that receive a communication from a device, wherein the communication comprises a device-type identifier that is associated with a type of device from which the communication is received; and one or more modules that:
  identify the device-type identifier from the communication, wherein the device-type identifier identifies a type of device from which the communication is received; and
  determine a service set associated with the type of device identified by the device-type identifier, wherein determining a service set associated with the type of device identified by the device-type identifier comprises:
    comparing the device-type identifier to one or more device-type identifiers that are stored within a database, wherein each of the one or more device-type identifiers is associated with a certain type of device, and wherein the database comprises a correlation between each respective one of the one or more device-type identifiers and a service set; and
    if a device-type identifier matching the device-type identifier associated with the device is found, identifying the service set correlated with the device-type identifier as the service set associated with the type of device identified by the device-type identifier that is associated with the device; and
  wherein the one or more interfaces output configuration information associated with the determined service set to the device.

8. The apparatus of claim 7, wherein each respective one of the one or more device-type identifiers is correlated with a service set that is designated for providing a service that is anticipated to be requested by the respective device-type.

9. The apparatus of claim 7, wherein determining a service set associated with the type of device identified by the device-type identifier comprises:
  comparing the device-type identifier to one or more device-type identifiers that are stored within a database, wherein the database comprises a correlation between each respective one of the one or more device-type identifiers and a service set; and
  if a device-type identifier matching the device-type identifier associated with the device is not found, identifying a default service set as the service set associated with the type of device identified by the device-type identifier that is associated with the device.

10. The apparatus of claim 7, wherein determining a service set associated with the type of device identified by the device-type identifier comprises:
  comparing the device-type identifier to one or more device-type identifiers that are stored within a database, wherein the database comprises a correlation between each respective one of the one or more device-type identifiers and a service; and
  if a device-type identifier matching the device-type identifier associated with the device is found, identifying the service correlated with the device-type identifier and identifying a service set associated with the identified service as the service set associated with the type of device identified by the device-type identifier that is associated with the device.

11. The apparatus of claim 7, wherein the one or more modules:
  determine that the determined service set is not active; and
  activate the determined service set after outputting configuration information associated with the determined service set to the device.

12. One or more non-transitory computer readable media having instructions operable to cause one or more processors to perform the operations comprising:
  receiving a communication from a device, wherein the communication comprises a device-type identifier that is associated with a type of device from which the communication is received;
  identifying a device-type identifier from the communication, wherein the device-type identifier identifies a type of device from which the communication is received;
  determining a service set associated with the type of device identified by the device-type identifier, wherein determining a service set associated with the type of device identified by the device-type identifier comprises:
    comparing the device-type identifier to one or more device-type identifiers that are stored within a database, wherein each of the one or more device-type identifiers is associated with a certain type of device, and wherein the database comprises a correlation between each respective one of the one or more device-type identifiers and a service set; and
    if a device-type identifier matching the device-type identifier associated with the device is found, identifying the service set correlated with the device-type identifier as the service set associated with the type of device identified by the device-type identifier that is associated with the device; and
  outputting configuration information associated with the determined service set to the device.

13. The one or more non-transitory computer-readable media of claim 12, wherein each respective one of the one or more device-type identifiers is correlated with a service set that is designated for providing a service that is anticipated to be requested by the respective device-type.

14. The one or more non-transitory computer-readable media of claim 12, wherein determining a service set associated with the type of device identified by the device-type identifier comprises:
  comparing the device-type identifier to one or more device-type identifiers that are stored within a database, wherein the database comprises a correlation between each respective one of the one or more device-type identifiers and a service set; and
  if a device-type identifier matching the device-type identifier associated with the device is not found, identifying a default service set as the service set associated with the type of device identified by the device-type identifier that is associated with the device.

15. The one or more non-transitory computer-readable media of claim 12, wherein determining a service set associated with the type of device identified by the device-type identifier comprises:
  comparing the device-type identifier to one or more device-type identifiers that are stored within a database, wherein the database comprises a correlation between each respective one of the one or more device-type identifiers and a service; and
  if a device-type identifier matching the device-type identifier associated with the device is found, identifying the service correlated with the device-type identifier and identifying a service set associated with the identified service as the service set associated with the type of device identified by the device-type identifier that is associated with the device.

16. The one or more non-transitory computer-readable media of claim 12, wherein the instructions are further operable to cause the one or more processors to perform the operations comprising:
   determining that the determined service set is not active; and
   activating the determined service set after outputting configuration information associated with the determined service set to the device.

17. The one or more non-transitory computer-readable media of claim 12, wherein the communication comprises a wireless provisioning services message.

* * * * *